(12) United States Patent
Kenig et al.

(10) Patent No.: US 12,170,599 B2
(45) Date of Patent: Dec. 17, 2024

(54) SUCCESS RATE INDICATOR SOLUTION FOR PIPELINES

(71) Applicant: Microsoft Technology Licensing, LLC

(72) Inventors: Ariel Kenig, Herzliya (IL); Yaniv Haim Yehuda, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/681,956

(22) Filed: Feb. 28, 2022

(65) Prior Publication Data

US 2023/0275816 A1   Aug. 31, 2023

(51) Int. Cl.
*H04L 41/5009* (2022.01)
*H04L 41/0654* (2022.01)
*H04L 43/04* (2022.01)

(52) U.S. Cl.
CPC ...... *H04L 41/5009* (2013.01); *H04L 41/0654* (2013.01); *H04L 43/04* (2013.01)

(58) Field of Classification Search
CPC ............ H04L 41/5009; H04L 41/0654; H04L 43/04
See application file for complete search history.

(56) References Cited

U.S. PATENT DOCUMENTS

| | | | |
|---|---|---|---|
| 9,344,355 B2 | 5/2016 | Vasseur et al. | |
| 10,853,337 B2 | 12/2020 | Barber et al. | |
| 11,366,842 B1* | 6/2022 | Swaminathan | G06F 17/18 |
| 11,429,353 B1* | 8/2022 | Liguori | G06F 9/54 |
| 2007/0263541 A1* | 11/2007 | Cobb | H04L 43/00 370/235 |
| 2014/0379889 A1* | 12/2014 | Faraboschi | H04L 43/08 709/224 |
| 2016/0104093 A1 | 4/2016 | Fletcher et al. | |
| 2017/0364843 A1* | 12/2017 | Haligowski | G06Q 10/0633 |
| 2018/0129712 A1 | 5/2018 | Mankovskii | |
| 2018/0254962 A1* | 9/2018 | Goyal | H04L 41/5009 |
| 2019/0363926 A1 | 11/2019 | Singhal et al. | |

(Continued)

OTHER PUBLICATIONS

Thurgood et al. "Site Reliability Engineering Workbook, Chapter 2—Implementing SLOs", archive.org, Nov. 20, 2021 [retrieved on Sep. 24, 2022]. Retrieved from the Internet: <URL: https://web.archive.org/web/20211120175643/https://sre.google/workbook/implementing-slos/>. (Year: 2021).*

(Continued)

*Primary Examiner* — Lesa M Kennedy

(57) ABSTRACT

Examples of the present disclosure describe systems and methods for implementing a success rate SLI solution for service pipelines. In aspects, a metrics service may detect that a number of payloads relating to one or more activities or service requests have been received at one or more services of a service pipeline. For each payload processed by a service of the service pipeline, the metrics service may determine a set of payload processing metrics for the service. The set of payload processing metrics for the service may be applied to the payload. The payload processing metrics for each service may be aggregated and used to calculate a success rate for payloads processed using the service pipeline. Based on the success rate, an SLI may be evaluated and/or an action associated with the activity/service request may be performed.

20 Claims, 9 Drawing Sheets

(56) References Cited

U.S. PATENT DOCUMENTS

| | | | |
|---|---|---|---|
| 2020/0257680 | A1 | 8/2020 | Danyi et al. |
| 2020/0366569 | A1 | 11/2020 | White |
| 2020/0382387 | A1 | 12/2020 | Pasupathy et al. |
| 2021/0109584 | A1 | 4/2021 | Guim et al. |
| 2021/0110328 | A1 | 4/2021 | Hsiao et al. |
| 2021/0357280 | A1* | 11/2021 | Long ................... G06F 11/3442 |
| 2022/0005018 | A1* | 1/2022 | White ................ G06Q 20/3278 |
| 2022/0060526 | A1* | 2/2022 | Jónsson .................. H04L 67/10 |
| 2022/0237102 | A1* | 7/2022 | Bugdayci ............ G06F 11/3495 |
| 2022/0261405 | A1* | 8/2022 | Shuster ............. G06F 16/24573 |

OTHER PUBLICATIONS

McCoy et al. "SLO Adoption and Usage in Site Reliability Engineering", O'Reilly Media, Inc., Apr. 2020 [retrieved on Sep. 24, 2022]. ISBN: 9781492075363. Retrieved from the Internet: <URL: https://www.oreilly.com/library/view/slo-adoption-and/9781492075370/ch04.html>. (Year: 2020).*

"The Comprehensive Guide on SLIs, SLOs, and Error Budgets". Blameless.com website, Nov. 15, 2021 [retrieved on Apr. 8, 2023]. Retrieved from the Internet: <URL: https://web.archive.org/web/20211115165919/https://www.blameless.com/the-comprehensive-guide-on-slis-slos-and-error-budgets>. (Year: 2021).*

Melachenko, Dmitry. "Monitoring Microservices: Divide and Conquer", medium.com website, May 17, 2018 [retrieved on Nov. 23, 2023]. Retrieved from the Internet: <URL: https://medium.com/salesforce-engineering/monitoring-microservices-divide-and-conquer-acca62b209cc>. (Year: 2018).*

Swersky, Dave. "The Hows, Whys and Whats of Monitoring Microservices", thenewstack.io website, Jun. 21, 2018 [retrieved on Nov. 23, 2023]. Retrieved from the Internet: <URL: https://thenewstack.io/microservices/the-hows-whys-and-whats-of-monitoring-microservices/>. (Year: 2018).*

"SLA for Azure Monitor", Retrieved From: https://web.archive.org/web/20200520191302/https://azure.microsoft.com/en-gb/support/legal/sla/monitor/v1_3/, May 20, 2020, 3 Pages.

Heider, Wolfgang, "Accelerate DevOps and Scale SRE with Service Level Objectives (SLOs)", Retrieved From: https://www.dynatrace.com/news/blog/in-product-guidance-accelerates-service-level-objectives-slo-setup-for-confident-deployments/, Dec. 9, 2020, 14 Pages.

Jones, et al., "Service Level Objectives", Retrieved from: https://web.archive.org/web/20201126184606/https://sre.google/sre-book/service-level-objectives/, Nov. 26, 2020, 11 Pages.

Parker, et al., "Distributed Tracing in Practice", In Publication of O'Reilly Media, Apr. 13, 2020, 20 Pages.

"International Search Report and Written Opinion Issued in PCT Application No. PCT/US22/051113", Mailed Date: Mar. 20, 2023, 14 Pages.

* cited by examiner

SUCCESS RATE INDICATOR SOLUTION FOR PIPELINES

BACKGROUND

In many cases, data related to an activity or a service request may be transmitted to one or more services in a service pipeline to fulfill the activity/service request. A service level indicator (SLI) measuring compliance with a service level agreement or service level objective may be computed for the data received and processed by each service. Generally, the SLI for a service is computed based on the number of payload processing failures detected for that service. However, this approach does not enable an accurate computation of the success rate SLI for the entire service pipeline.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for implementing a success rate SLI solution for service pipelines. In aspects, a metrics service may detect that a number of payloads relating to one or more activities or service requests have been received at one or more services of a service pipeline. For each payload processed by a service of the service pipeline, the metrics service may determine a set of payload processing metrics generated by the service. The set of payload processing metrics for the service may be applied to the payload. The payload processing metrics for each service may be aggregated and used to calculate a success rate for payloads processed using the service pipeline. Based on the success rate, an SLI may be evaluated and/or an action associated with the activity/service request may be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
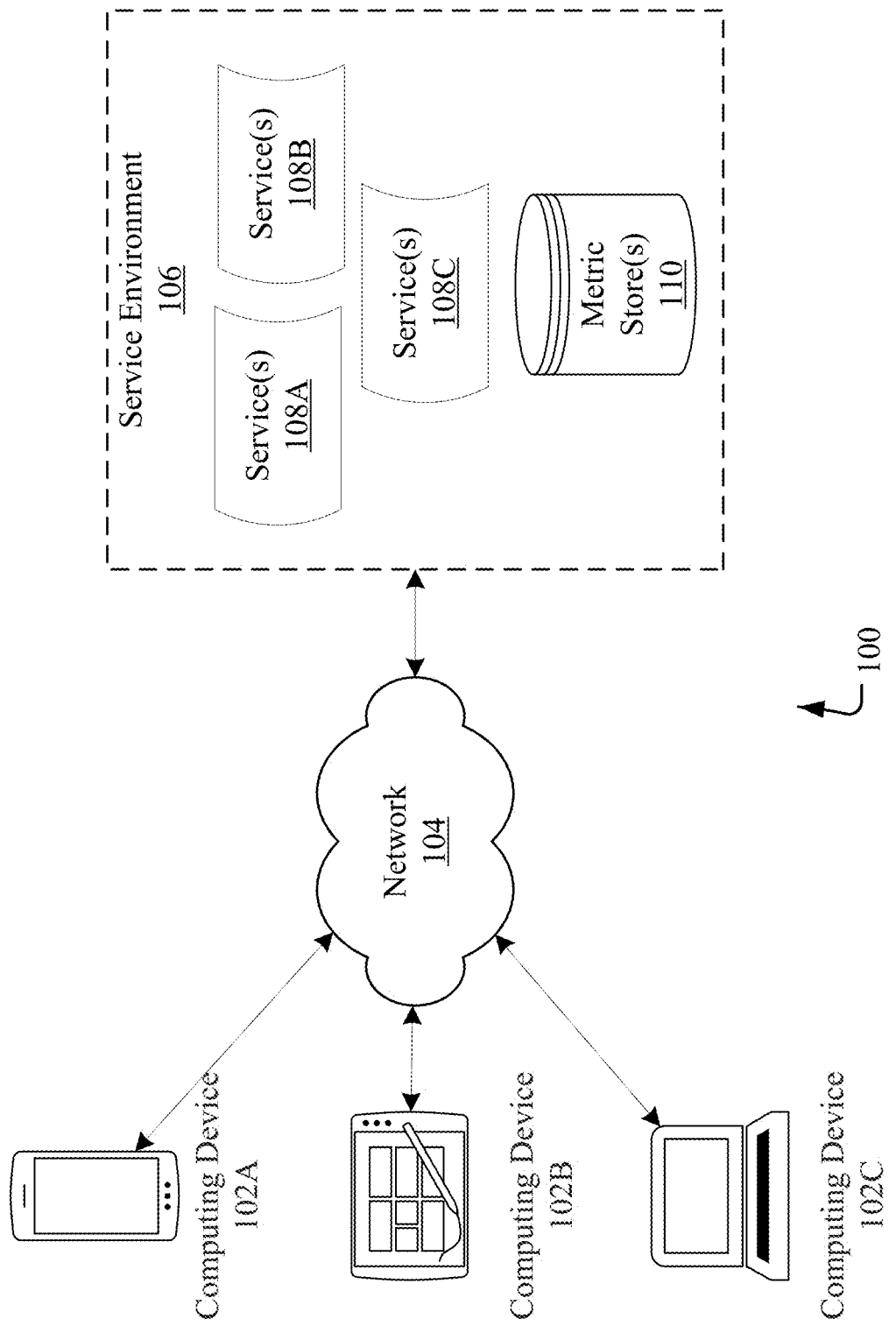
FIG. 1 illustrates an overview of an example system for implementing a success rate SLI solution for service pipelines.

Typically, operating environments (e.g., computing systems and platforms) implement multiple software services that perform automated tasks, process hardware events, monitor for data requests, etc. Many activities (e.g., tasks, projects, data requests) in an operating environment must be completed using multiple services. The services required to complete an activity may constitute a service pipeline, in which the output of one service is provided as input to another service until a final service is reached. In many cases, one or more of these services are developed and/or maintained by different teams or entities. These teams or entities may belong to separate organizations and have different methods and standards of measuring the performance of their respective services. As one example, each team or entity may separately measure the success rate for its service based on the number of payloads that failed to be successfully processed by the service. The individual success rates may be used as or to evaluate SLIs for the respective services.

Although this service-specific method of separately calculating success rates may be reasonably accurate within the context of a single service, it cannot be used to accurately calculate success rates for the entire service pipeline for at least two reasons. The first reason is that the service-specific method fails to take into account the number of initial payloads (e.g., payloads received by the first service of the service pipeline) that are received by subsequent services of the service pipeline. While being transmitted to or between services of a service pipeline, the transmission of the initial payloads may fail (e.g., payloads may be dropped, held/quarantined, or otherwise undeliverable), thereby causing inaccuracies in the success rates metrics for services of the service pipeline. As a specific example, a first service in a service pipeline may receive 100 payloads for processing. The first process may successfully process all 100 of the received payloads. The 100 payloads may then be transmitted to a second service in the service pipeline. During transmission to the second service, 25 of the 100 payloads may be lost due to network instability. The remaining 75 payloads may be successfully processed by the second service. The 75 payloads may then be transmitted to a third service in the service pipeline. During transmission to the third service, 25 of the 75 payloads may be lost due to continued network instability. The remaining 50 payloads may be successfully processed by the third service. From a service-specific perspective, each service successfully processed 100% of the payloads received by that service. Thus, despite 50 of the 100 payloads failing to be successfully processed by the service pipeline, the service-specific method would calculate the average success rate for the service pipeline to be 100%.

The second reason is that the service-specific method fails to take into account that a service may not be able to identify every type of failure that a payload may encounter while being processed by the service. As an example, a service implementing error handling for a finite set of expected payload failure events may receive 100 payloads for processing. The service may fail to process five (5) payloads due to errors covered by the set of expected payload failure events and may fail to process 20 payloads due to errors not covered by the set of expected payload failure events. As a result, although the service may record the five (5) failed payloads as failures, the service may not record the 20 failed payloads as failures. Despite the 20 failed payloads, from a service-specific perspective, the service successfully processed 95% of the payloads received by the service.

Aspects of the present disclosure address the challenges of the above-described service-specific method, as well as other challenges regarding SLI measurement. The present disclosure describes systems and methods for implementing a success rate SLI solution for service pipelines. In aspects, a metrics service may be implemented in a system comprising or having access to one or more separate services. In one example, a cloud computing system for application, service, and resource management incorporates a service environment. The service environment provides access to cloud-based services, such as a log searching service used to search log files for detected alerts/notifications, an alerts management service used to evaluate and process detected alerts/notifications, and a notification service for providing notifications about the detection and handling of alerts/notifications. The service environment also provides access to a metrics store that implements a metric service used to monitor and store data generated by cloud-based services of the cloud computing system. In another example, a cloud computing system incorporates a cloud application for deploying and managing cloud applications. The cloud application provides access to cloud-based services and may provide access to one or more services that are not cloud-based. The cloud application also provides access to a metrics service that implements a metric store for storing data generated by services and other components provided by the cloud computing system.

The metrics service may monitor data transmitted to or by the services. Upon detecting an activity request (manual or automated), a service pipeline comprising services for accomplishing the activity may be identified. In examples, an activity request is a manual or an automated request (e.g., search query or executable command) to provide data and/or perform one or more actions. Examples of activity requests include querying for data, managing and collecting data, scheduling meeting/events, creating/accessing/modifying content and documents, managing applications/services, managing computing resources (e.g., applications, devices, storage, processing power, networking, analytics, intelligence, virtual machine (VM) instances), performing data analytics and machine learning (ML) activities, managing user/user account information, managing projects/tasks, creating and managing orders/jobs, managing and providing notifications/messages/alerts, and managing communications between users and/or devices.

One or more payloads relating to the activity may be provided to a first service in the service pipeline. In examples, a payload is a portion of a packet or other data transmission object comprising data to be transmitted from a source device/location to one or more destination devices/locations. A payload may comprise data corresponding to an event, an entity, a transaction, or the like. For instance, a payload may comprise an identifier of an entity or source device that initiated the activity request, one or more search terms or executable commands, additional content related to a request (e.g., a document, audio data, image data, video data), and an identifier of one or more services or applications to be used for processing the search terms/executable commands and additional content. In examples, a service refers to software and/or hardware functionality used to process received payloads in accordance with a set of rules/policies. Examples of services include word processing services, spreadsheet services, presentation services, document-reader services, social media software/platforms, search engine services, media software/platforms, multimedia player services, content design software/tools, and database software/tools, provisioning services, and alert/notification services. In examples, a service pipeline refers to a set of services arranged such that the output from one service is provided as input to another service. A service pipeline is defined by the services used to fulfill an activity request (or a portion of the activity request) and the processing order of those services. For instance, two different services may be used to fulfill a user's activity request such that initial payloads associated with the user's activity request are provided to one of the services and output of the service is provided to the other service. Thus, the two different services form a service pipeline for fulfilling the activity request.

The first service may process the payloads and emit metrics data associated with the processed payloads. In examples, a service emits metrics data by transmitting metrics data related to payloads processed by the service to a separate service, application, or storage location. The metrics data is transmitted in real-time (e.g., during payload processing or upon completion of payload processing), according to a predefined schedule (e.g., every minute, hourly, daily), or in response to an event (e.g., a user request for processing status or processing termination). The metrics data is transmitted for each individual payload during payload processing, upon completion of processing payload, or after completion of processing payload. Alternatively, metrics data is transmitted for a batch of payloads processed within a predefined time period (e.g., one minutes, ten minutes, one hour). In examples, a metric or metrics data refers to a quantifiable measure or attribute used to monitor and evaluate data. Examples of metrics data include payload identifiers, timestamps for payload processing commencement, timestamps for payload processing completion, payload processing results (e.g., success, failure, skipped), and service identification information. The metrics service may collect the metrics data emitted by the first service, apply the metrics data to the payloads (e.g., add the metrics data to a header or body of a payload), and store the metrics-applied payloads in a data store.

When the payloads have been processed by the first service, the payloads may be transmitted to a second service in the service pipeline. During the transmission of the payloads from the first service to the second service, the payloads may be transmitted to one or more intermediate services or destinations or subjected to intermediate evaluation or processing. In at least one example, one or more of the transmitted payloads is lost during transmission due to various issues, such as network instability, payload data corruption, malformed payloads or payload data, lack of access privileges, or unreachable services or utilities. The metrics service monitors the transmission of the payloads from the first service to the second service and collects data regarding the number of payloads sent from the first service and received by the second service. The metrics service may also collect data regarding the reason a transmitted payload has not been successfully transmitted to the second service.

Upon receiving the payloads transmitted from the first service, the second service may process the transmitted payloads and emit metrics data associated with the processed payloads. The dimensions (e.g., attributes and/or corresponding values) of the metrics data emitted by the second service may be similar to or the same as the dimensions of the metrics data emitted by the first service. The metrics service (or the second service) may collect the metrics data emitted by the second service, apply the metrics data to the metrics-applied payloads previously stored in the data store, and store the updated metrics-applied payloads in the data store. The payloads processed by the second service may then be transmitted to one or more additional services in the service pipeline. The metrics service may monitor the transmission of the payloads to the additional services and collect metrics data associated with the processing of the payloads by the additional services, as described above.

When the metrics service has collected metrics data for the payloads processed by the last service in the service pipeline, the metrics service may use the metrics data collected from each service to calculate a success rate for the service pipeline. In some examples, the success rate is calculated based on the number of payloads skipped by each service in the service pipeline, the number of payloads that were successfully processed by the last service in the service pipeline, the number of payloads that were initially received by the first service in the service pipeline, and the number of payloads that were transmitted to the first service in the service pipeline. In at least one example, the success rate is calculated based on the number of payloads skipped by each service in the service pipeline, the number of payloads that were successfully processed by the last service in the service pipeline, and the number of payloads that were initially received by the first service in the service pipeline. In at least one example, the success rate is calculated based on the number of payloads skipped by each service in the service pipeline, the number of payloads that were successfully processed by the last service in the service pipeline, and the number of payloads that were transmitted to the first service in the service pipeline. A skipped payload as used herein represents a payload that has been successfully and completely processed by a current service such that there is no reason to transmit the payload to another service for additional processing.

In some examples, one or more actions may be performed based on the calculated success rate for the service pipeline. As one example, the metrics service or the last service in the service pipeline causes a real-time message or notification to be created and provided to a user. Examples of user include end users, customers, support engineers, and service team members. As another example, the metrics service or the last service in the service pipeline triggers a webhook, executes a reporting function, or causes an automated process to be initiated.

Accordingly, in contrast to previous service-specific solutions for measuring SLI, aspects of the present disclosure provide for measuring service pipeline SLI from a user's perspective using minimal telemetry data. That is, a user is able to determine the success rate of payloads transmitted and processed across the entire service pipeline based primarily (or only) on metrics data emitted during service pipeline processing. Determining the success rate based primarily (or only) on metrics data is beneficial because the user-centric solution proposed in the present disclosure does not rely on the flawed assumption that all of the errors during payload processing and transmission will be detectable by the services of the service pipeline. Additionally, using metrics data (as opposed to using, for example, log file data) reduces the complexity of aggregating and analyzing the data.

Moreover, the ability to determine the success rate of the service pipeline not only provides users with an accurate, real-time view of a requested activity or service request, but it also provides benefits to the service teams supporting the services. For instance, the determined success rate of a service pipeline may enable service teams to monitor and dynamically react to problems and trends in service pipeline flows. As a specific example, the success rate of a particular pipeline comprising service 1, service 2, and service 3 may be determined to be 90% (e.g., 90% of the payloads provided to service 1 are eventually successfully processed by service 3). However, a large majority of the 10% of payloads that were not processed successfully may be attributable to payload transmission failures between service 1 and service 2, and payload processing failures by service 3. As such, a service team may use this information to alter the network route between service 1 and service 2 and/or perform additional payload pre-processing on payloads being transmitted to service 3.

Thus, the present disclosure provides a plurality of technical benefits and improvements over previous SLI solutions. These technical benefits and improvements include: monitoring and recording payload flow to and between services of a service pipeline to identify payload transmission quality and/or failure points, monitoring and recording payload flow in a service pipeline to determine service processing quality and/or failure points, recording metrics data emitted by individual services and/or service subparts to determine granular payload processing quality and/or failure points, correlating/assigning metric data to corresponding payloads processed by a service pipeline to enable payload tracking, calculating a customer-centric service pipeline success rate measurement, and actuating a set of corrective or responsive actions based on a calculated service pipeline success rate, among other examples.

FIG. 1 illustrates an overview of an example system for implementing a success rate SLI solution for service pipelines. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, components of systems disclosed herein are implemented on a single processing device. The processing device may provide an operating environment for software components to execute and utilize resources or facilities of such a system. An example of processing device(s) comprising such an operating environment is depicted in FIGS. 5-8. In another example, the components of systems disclosed herein are distributed across multiple processing devices. For instance, input may be entered on a user device or client device and information may be processed on or accessed from other devices in a network, such as one or more remote cloud devices or web server devices.

In FIG. 1, system 100 comprises user devices 102A, 102B, and 102C (collectively "user device(s) 102"), network 104, service environment 106, service(s) 108A, 108B, and 108C (collectively "service(s) 108"), and metrics store(s) 110. One of skill in the art will appreciate that the scale and structure of systems such as system 100 may vary and may include additional or fewer components than those described in FIG. 1. As one example, system 100 may comprise or have access to multiple service environments 106. As another example, one or more of metrics store(s) 110 may be located externally to service environment 106. As yet another example, user device(s) 102 may comprise or locally access one or more of service(s) 108 and/or metrics store(s) 110.

User device(s) 102 may be configured to detect and/or collect input data from one or more users or devices. In some examples, the input data corresponds to user interaction with one or more software applications or services implemented by, or accessible to, user device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data may include, for example, voice input, touch input, text-based input, gesture input, video input, and/or image input. The input data may be detected/collected using one or more sensor components of user device(s) 102. Examples of sensors include microphones, touch-based sensors, geolocation sensors, accelerometers, optical/magnetic sensors, gyroscopes, keyboards, and pointing/selection tools. Examples of user device(s) 102 include personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices.

User device(s) 102 may transmit information associated with the collected input data as one or more payloads. A payload may comprise data corresponding to an event, an entity, a transaction, or other information associated with an activity. As one example, a payload comprises an entity identifier (e.g., user id, device id, organization id), event information (e.g., event id, documents or document content, location information, date/time information, participant information, a set of conditions for triggering the event, a rule set for executing the event), and/or transaction information (e.g., the object or content of the transaction, transaction participant ids, identification of services/applications/systems used in the transaction, rule set for conducting the transaction). User device(s) 102 may transmit the payloads to and receive response data from service environment 106 using network 104. Examples of network 104 include a private area network (PAN), a local area network (LAN), a wide area network (WAN), and the like. Although network 104 is depicted as a single network, it is contemplated that network 104 may represent several networks of similar or varying types.

Service environment 106 may be configured to provide access to various computing services and resources (e.g., applications, devices, storage, processing power, networking, analytics, intelligence) over one or more networks, such as network 104. Service environment 106 may be implemented in a cloud-based or server-based environment using one or more computing devices, such as server devices (e.g., web servers, file servers, application servers, database servers), personal computers (PCs), virtual devices, and mobile devices. The computing devices may comprise one or more sensor components, as discussed with respect to user device(s) 102. Service environment 106 may comprise numerous hardware and/or software components and may be subject to one or more distributed computing models/services (e.g., Infrastructure as a Service (IaaS), Platform as a Service (PaaS), Software as a Service (SaaS), Functions as a Service (FaaS)). In aspects, service environment 106 comprises or provides access to service(s) 108 and metrics store(s) 110.

Service(s) 108 may be integrated into (e.g., hosted by or installed in) service environment 106. Alternatively, one or more of service(s) 108 may be implemented externally to and expose functionality to service environment 106. Service(s) 108 may provide access to a set of software and/or hardware functionality. In examples, two or more of service(s) 108 are used to form a service pipeline for processing payloads received from user device(s) 102. Each service in the service pipeline may process received payloads, transmit processed payloads to downstream services of the service pipeline, and emit metrics data relating to processed payloads. Examples of service(s) 108 include word processing services, spreadsheet services, presentation services, document-reader services, social media software/platforms, search engine services, media software/platforms, multimedia player services, content design software/tools, and database software/tools, provisioning services, and alert/notification services.

Metrics store(s) 110 may be integrated into or located remotely from service environment 106 and service(s) 108. In one example, metrics store(s) 110 is deployed on one or more VMs in service environment 106. In another example, metrics store(s) 110 is deployed on one or more computing machines external to service environment 106 and metrics store(s) 110 interacts with service environment 106 via an interface, such as an exposed API. Metrics store(s) 110 may be configured with a listener mechanism used to detect when payloads are received by or transmitted between service(s) 108. The listener mechanism may also be used to detect metrics data emitted by service(s) 108. Metrics store(s) 110 may collect and store detected metrics data and counts of the transmitted and processed payloads. Metrics store(s) 110 may be further configured with or to operate in conjunction with a software solution that enables users to create, share, and consume software code that may be bundled into packages comprising compiled code, uncompiled code, and other content used to describe and consume the packages. The software solution may be used to align emitted metrics data for a specific payload across each service that processes the payload. In a particular example, the software solution may synchronize the metrics data for a payload such that each service that processes the payload emits metrics data having the same type and/or set of dimensions. Examples of the software solution include software development kits (SDKs), APIs, integrated development environments (IDEs), and various software development frameworks.

In examples, metrics store(s) 110 or the software solution apply, append, or otherwise affix emitted metrics data to corresponding payloads processed by each of service(s) 108. As one example, the metrics data are appended to a header or body section of a payload. The application of the emitted metrics data to the payloads enables metrics store(s) 110 to track the amount of processing time and success of payload processing for specific payloads throughout the service pipeline.

After storing the emitted metrics data, metrics store(s) 110 may aggregate the metrics data into one or more analysis categories (e.g., metrics per minute, count of metrics dimension per hour, min/max of metrics value for each metrics dimension). Metrics store(s) 110 may use the aggregated metrics data to calculate the payload processing success rate of the service pipeline and/or one or more of service(s) 108.

As one example, metrics store(s) 110 calculate a success rate of a service pipeline based on the number of payloads skipped by each service in the service pipeline, the number of payloads that were successfully processed by the last service in the service pipeline, the number of payloads that were initially received by the first service in the service pipeline, and the number of payloads that were transmitted to the first service in the service pipeline. As another example, metrics store(s) 110 calculate a success rate of a service pipeline based on the number of payloads skipped by each service in the service pipeline, the number of payloads that were successfully processed by the last service in the service pipeline, and the number of payloads that were initially received by the first service in the service pipeline. As yet another example, metrics store(s) 110 calculate a success rate of a service pipeline based on the number of payloads skipped by each service in the service pipeline, the number of payloads that were successfully processed by the last service in the service pipeline, and the number of payloads that were transmitted to the first service in the service pipeline. Although particular methods of calculating the success rate of a service pipeline are discussed herein, one of skill in the art will appreciate that alternative methods of calculating success rates are contemplated. Based on the calculated success rate of the service pipeline, metrics store(s) 110 may cause one or more actions to be performed. The action(s) may be in furtherance of completing (or otherwise addressing) an activity related to the received payloads. In some examples, the action is to transmit a message or result set to user device(s) 102.

Figure 2:
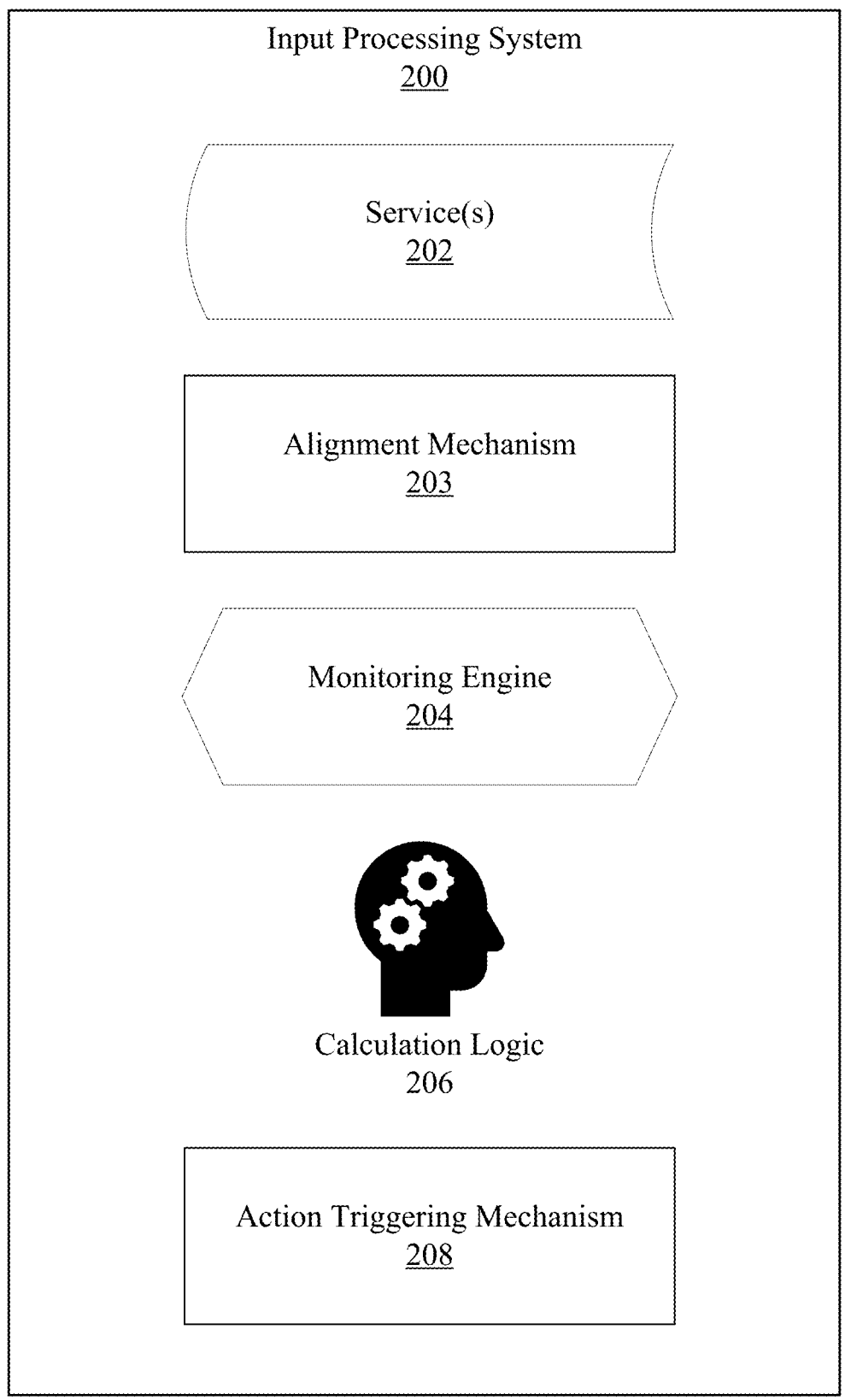
FIG. 2 illustrates an example input processing system for implementing a success rate SLI solution for service pipelines.

FIG. 2 illustrates an example input processing system for implementing a success rate SLI solution for service pipelines. The techniques implemented by input processing system 200 may comprise the techniques and data described in system 100 of FIG. 1. Although examples in FIG. 2 and subsequent figures will be discussed in the context of end-to-end service pipelines, the examples are equally applicable to other contexts, such as individual services, intermediate service pipelines within a larger end-to-end service pipeline, other types of pipelines, and other metrics-based analyses. In some examples, one or more data and components described in FIG. 2 (or the functionality thereof) are distributed across multiple devices in one or more computing environments. In other examples, a single device comprises the data and components described in FIG. 2.

In FIG. 2, input processing system 200 comprises service(s) 202, alignment mechanism 203, monitoring engine 204, success rate calculation logic 206, and action triggering mechanism 208. One of skill in the art will appreciate that the scale of input processing system 200 may vary and may include additional or fewer components than those described in FIG. 2. As one example, the functionality of alignment mechanism 203, success rate calculation logic 206, and/or action triggering mechanism 208 are integrated into monitoring engine 204.

Service(s) 202 may be configured to provide access to a set of software and/or hardware functionality. The access may be provided to a user or a device via a user interface, an API, or any other means. In examples, service(s) 202 receive one or more payloads comprising data related to an automated or user-requested activity or service request. The payloads may be processed by two or more of service(s) 202 in a processing order that defines a service pipeline. The service pipeline may be organized such that the first service to receive the payloads is the service pipeline entry point and the last service to process the payloads is the service pipeline exit point. The first service may process received payloads, then transmit the processed payloads to a second service in the service pipeline. The second service may process payloads received from the first service, then transit the processed payloads to a third service in the service pipeline, and so on until the payloads are received and processed by the last service in the service pipeline.

Upon processing received payloads, each of service(s) 202 may emit a set of metrics data for the processed payloads. In examples, each of service(s) 202 represent one or more services and each of the one or more service may emit a set of metrics data. The emitted metrics data may be grouped by each service or by a cluster of similar or related services. Examples of metrics data include payload identifiers, number of payloads received, timestamps for payload delivery/receipt, timestamps for payload processing commencement, timestamps for payload processing completion, payload processing results (e.g., success, failure, skipped), and service identification information.

Alignment mechanism 203 may be configured to synchronize emitted payload metrics data across service(s) 202. In examples, alignment mechanism 203 is integrated with service(s) 202 such that alignment mechanism 203 causes each of service(s) 202 to emit a particular type or format of metrics data for processed payloads. As a specific example, alignment mechanism 203 may cause a first service in a service pipeline to emit a timestamp representing the time the service received the payload or commenced processing the payload ("processing start time"). Alignment mechanism 203 may then cause each subsequent service in the service pipeline to emit the processing start time of the first service when that subsequent service receives or processes the payload, thereby enabling the processing time of a payload to be accurately tracked from the time the payload entered the service pipeline to the time the payload exited the service pipeline. In alternative examples, alignment mechanism 203 does not cause service(s) 202 to emit a particular type or format of metrics data for processed payloads. Instead, service(s) 202 may be configured to emit the particular type or format of metrics data.

The ability to track the processing time of a payload throughout the service pipeline is important and beneficial because, in some instances, a service may require an extended period of time to process a payload (e.g., 20 minutes, an hour, or longer). In such instances, a payload may have a start time that falls into a first time bin (e.g., bin N) and a completion time that falls into a separate bin (e.g., bin N+1). As the volume of payloads processed by a service often varies over time and the volume of payloads in each time bin can vary accordingly, synchronizing the metrics data that measures the success of the same payload according to a single timestamp enables an accurate calculation of the SLI for payloads represented by each time bin.

Alignment mechanism 203 may be further configured to synchronize a metrics data schema across service(s) 202. In examples, alignment mechanism 203 comprises or has access to a data schema for emitted metrics data. The data schema may describe or define a set of permissible or required dimensions (e.g., attributes, attribute types, values, and/or value ranges), dimension formatting, and/or dimension ordering, among other examples. The data schema may be applied to service(s) 202 to ensure that each of service(s) 202 emits metrics data having the same (or a similar) format and/or set of dimensions. In some examples, a data schema comprises dimensions and other data relating to service(s) 202, service monitoring system information, metrics data monitoring system information, metrics data processing system information, metrics data processing rules/conditions, metrics data scores/weights, and so on. Specific examples of data schema dimensions include a monitoring system identifier, a monitoring source identifier, an indicator of whether a metric dimension is an SLI, a monitoring system location, a rule or rule set identifier, a suggested action, a set of weights for one or more actions, and a set of weights for entries in one or more dimensions.

Monitoring engine 204 may be configured to monitor payload information for payloads transmitted to service(s) 202 and metrics data emitted by service(s) 202. In examples, monitoring engine 204 implements an event listener function or procedure (or similar functionality). The listener may be programmed to react to an input or signal indicating the occurrence of a specific event by calling an event handler. Upon detecting that payloads have been transmitted to service(s) 202, monitoring engine 204 may determine the number of payloads that have been transmitted, the number of payloads that failed or were lost while in transit to service(s) 202, a reason for payload transmission failure, a location (e.g., node in the network) where payload transmission failure occurred, and/or a time period during which payload transmission failure occurred, among other examples.

Upon detecting metrics data emitted by service(s) 202, monitoring engine 204 may apply emitted metrics data to a corresponding payload (e.g., the payload(s) for which the metrics data was generated). For example, monitoring engine 204 may add the metrics data to a header of a payload, append the metrics data to the body of a payload, or otherwise associate the metrics data with a payload. Monitoring engine 204 may also apply additional metrics data and/or information to a payload. The additional metrics data and/or information may be generated by monitoring engine 204 and/or identified in the data schema described above. Alternatively, service(s) 202 or alignment mechanism 203 may apply the emitted metrics, additional metrics data, and/or information to a payload. In examples, the additional metrics data and/or information provide for a more robust or granular breakdown and analysis of the performance and capabilities of a service pipeline. Monitoring engine 204 may store the metrics-applied payloads and/or provide the metrics-applied payloads to a data store (not shown) accessible to input processing system 200.

Success rate calculation logic 206 may be configured to aggregate metrics data and information collected by monitoring engine 204. Aggregating the metrics data may include combining the metrics data and information into bins representing each service. As one example, the aggregated metrics data for each of service(s) 202 includes counts of the payloads received by the service, the count of payloads that failed processing by the service, the count of payloads that are classified as skipped (e.g., processed by the service such that further processing by downstream services is not needed), and/or the count of payloads successfully processed by the service. In some examples, the aggregated metrics data is further combined into additional bins and/or sub-bins representing subparts of the service (e.g., individual functions, procedures, processes, or methods of the service).

Success rate calculation logic 206 may use the aggregated metrics data to calculate a success rate for the service pipeline and/or one or more portions of the service pipeline. The success rate may represent the SLI for the service pipeline. Calculating the success rate may include providing at least a portion of the aggregated metrics data as input to success rate calculation logic 206, using success rate calculation logic 206 to process the aggregated metrics data, and receiving the success rate as output from the success rate calculation logic 206. In some examples, the success rate is calculated based on the number of payloads skipped by each service in the service pipeline, the number of payloads that were successfully processed by the last service in the service pipeline, the number of payloads that were initially received by the first service in the service pipeline, and the number of payloads that were transmitted to the first service in the service pipeline. In other examples, the success rate is calculated based on the number of payloads skipped by each service in the service pipeline, the number of payloads that were successfully processed by the last service in the service pipeline, and the number of payloads that were initially received by the first service in the service pipeline. In other examples, the success rate is calculated based on the number of payloads skipped by each service in the service pipeline, the number of payloads that were successfully processed by the last service in the service pipeline, and the number of payloads that were transmitted to the first service in the service pipeline.

In at least one example, the success rate is based on fewer or additional metrics data, such as the number of payloads that failed to be processed by the service pipeline, the number of payloads that were received by each service in the service pipeline, the number of payloads that were processed by the service pipeline within a particular time period, the amount of processing time by each service, and so on. In another example, the success rate is based on the number of payloads that failed to be processed by the service pipeline, the number of payloads that were transmitted to each service in the service pipeline, the number of payloads that were processed by the service pipeline within a particular time period, the amount of processing time by each service, and so on. Examples of success rate calculation logic 206 include an algorithm, a formula, a rule set, or a machine learning model.

Action triggering mechanism 208 may be configured to perform one or more actions based on the calculated success rate for a service pipeline. In examples, action triggering mechanism 208 receives or otherwise has access to the success rate or an indication of the success rate. Action triggering mechanism 208 may evaluate the success rate to determine whether one or more actions is to be performed. Evaluating the success rate may include comparing the success rate to one or more threshold values, applying a rule set to the success rate, or applying other decision logic to the success rate. In some examples, the evaluation of the success rate determines that multiple actions are available to be performed. The multiple actions may be associated with weights or rankings that dictate which of the available actions to select or an order in which the multiple actions are to be performed. Examples of actions include providing to a customer and/or service team associated with a service of the service pipeline: a notification or alert associated with an activity, the success rate of the service pipeline (or an indication thereof), payload processing information for the services of the service pipeline, payload transmission and/or processing information for payloads during transmission between services of the service pipeline, and a result set of content associated with an activity. Additional examples of actions include executing reporting functionality associated with the service pipeline payload processing, executing or provisioning a process or a service, terminating or removing an executing process or an executing service, performing corrective or preventative actions, scheduling one or more events or tasks to be performed, providing instructions for potential or recommended actions, or alerting a third party of actions to be performed.

Having described various systems that may be employed by the aspects disclosed herein, this disclosure will now describe one or more methods that may be performed by various aspects of the disclosure. In aspects, method 300 may be executed by a system, such as system 100 of FIG. 1 or input processing system 200 of FIG. 2. However, method 300 is not limited to such examples. In other aspects, method 300 is performed by a single device or component that integrates the functionality of the components of system 100 and/or input processing system 200. In at least one aspect, method 300 is performed by one or more components of a distributed network, such as a web service or a distributed network service (e.g. cloud service).

Figure 3:
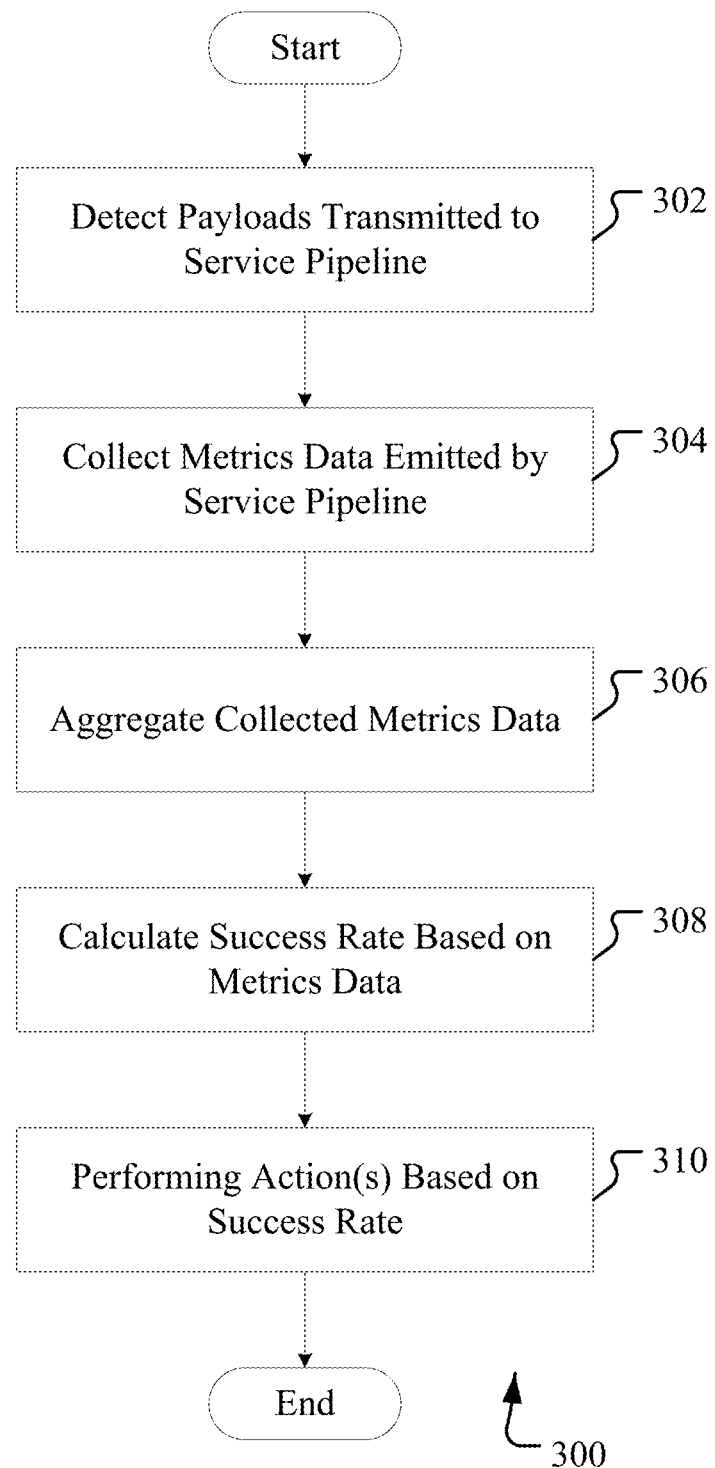
FIG. 3 illustrates an example method for implementing a success rate SLI solution for service pipelines.

FIG. 3 illustrates an example method for implementing a success rate SLI solution for service pipelines. Example method 300 begins at operation 302, where a metrics service, such as (or as provided by) monitoring engine 204, detects that one or more payloads relating to an activity or service request have been received by or transmitted to a service in a service pipeline, such as service(s) 202. The metrics service may also detect that one or more of the payloads failed during transmission to the service in the service pipeline. For payloads that failed during transmission, the metrics service may determine the network location of the failure (e.g., the network node or service where the payload was dropped/lost) and/or the reason for the failure (e.g., network instability, payload data corruption, malformed payloads or payload data, lack of access privileges, or unreachable services or utilities). The metrics service may store the information related to the transmitted payloads in one or more data stores.

In some examples, the payloads are transmitted to the metrics service from a user device, such as user device(s) 102. In other examples, the payloads are transmitted to the metrics service by a device or service in an operating environment of the metrics service, such as service environment 106. In either example, the payloads may be generated in response to user interaction or as part of an automated process not directly involving user interaction. The payloads may comprise data corresponding to an event, an entity, a transaction, etc. associated with the activity/service request.

At operation 304, the metrics service collects metrics data for the payloads. After receiving the payloads, each of the services in the service pipeline may attempt to process the payloads. The services may process the received payloads in furtherance of completing the activity/service request associated with the payloads. While processing the payloads, each service may emit metrics data for each payload or for a stream of payloads. In at least one example, the services emit metrics data for subparts of the service involved in processing the payloads (e.g., individual functions, procedures, processes, or other portions of software code). The emitted metrics data may include, for example, payload identifier, number of payloads received, processing start time, processing end time, processing results (e.g., success, failure, skipped), and/or service identification information. The metrics service may detect the emitted metrics data using an event listener mechanism.

In examples, a synchronization component, such as alignment mechanism 203, causes the first service in the service pipeline to emit a timestamp representing the processing start time for the service. The synchronization component may then cause each subsequent service in the service pipeline to emit the processing start time of the first service when that subsequent service processes the payload. Alternatively, the synchronization component may simply associate the processing start time of the first service with the metrics data emitted by each of the subsequent services. In at least one example, the synchronization component applies a data schema to the emitted metrics. The data schema may be used to standardize the metrics data emitted by each service in the service pipeline (e.g., ensure a similar format and/or set of dimensions). For instance, each service may emit metrics data comprising at least a S1StartTimeStamp dimension, a MeasuredSystem dimension, a ResourceId dimension, an ExcludeFromSLI dimension, an InstanceID dimension, and a Location dimension. The S1StartTimeStamp dimension may indicate the processing start time of the first service in the service pipeline, the MeasuredSystem dimension may indicate an identifier of the metrics service, and the ResourceId dimension may indicate a monitored resource, the ExcludeFromSLI dimension may indicate whether metrics data subsets are to be excluded from usage or consideration in the SLI analysis, the InstanceID dimension may indicate the name of the instance or computing device that is performing the processing, and the Location dimension may indicate the physical or logical location of the instance or computing device (e.g., region or data center).

The metrics service may collect the metrics data emitted by each service and apply the emitted metrics data to the corresponding payloads. Applying the metrics data to a payload may include adding the metrics data to a header of a payload, appending the metrics data to the body of a payload, storing the payload identifier and corresponding metrics data in a database table (or similar data structure), or otherwise associating the metrics data with a payload. As one example, the metrics service applies a payload identifier, a first processing start time, a first processing end time, and a first processing result to a payload processed by a first service in a service pipeline. Upon detecting that a second service in the service pipeline has processed the payload and emitted metrics data for the payload, the metrics service may subsequently apply a second processing end time and a second processing result for the second service to the payload. In such an example, the metrics service may use the payload identifier emitted by each service to match the two sets of metrics data for the payload. The metrics service may store the metrics-applied payloads in the data store(s) discussed above.

At operation 306, the metrics service aggregates the metrics data for the payloads. An aggregation mechanism, such as or as provided by calculation logic 206, may be used to dynamically aggregate the metrics data while the payloads are being processed by the service pipeline or after processing by the service pipeline has completed. Aggregating the metrics data may include grouping the metrics data by one or more services (or service subparts) and/or one or more dimensions of the metric data. As one example, the metrics data are grouped by service and by the various values in the processing results dimension (e.g., success, failure, skipped). As another example, the metrics data are grouped by the software code functions of a service, the processing time dimension, and/or the processing results dimension.

At operation 308, the metrics service calculates a success rate for the service pipeline based on the aggregated metrics data. Calculating the success rate may include applying calculation logic, such as calculation logic 206, to the aggregated metrics data, such as one or more algorithms, formulae, rule sets, or machine learning models. In one example, the success rate is calculated based on the number of payloads skipped by each service in the service pipeline, the number of payloads that were successfully processed by the last service in the service pipeline, and the number of payloads that were initially received by the first service in the service pipeline. For instance, the success rate of a service pipeline may be calculated by calculating the sum of the number of payloads skipped by each service in the service pipeline and the number of payloads successfully processed by the last service in the service pipeline, then dividing the sum by the number of payloads that were initially received by the first service in the service pipeline. In another example, the success rate is calculated based on the number of payloads skipped by each service in the service pipeline, the number of payloads that were successfully processed by the last service in the service pipeline, and the number of payloads that were transmitted to the first service in the service pipeline. For instance, the success rate of a service pipeline may be calculated by calculating the sum of the number of payloads skipped by each service in the service pipeline and the number of payloads successfully processed by the last service in the service pipeline, then dividing the sum by the number of payloads that were transmitted to the first service in the service pipeline. In such examples, the resultant success rate value represents the percentage of payloads received by the first service that were successfully processed by the service pipeline.

In other examples, the success rate is based on fewer or additional metrics data than described above. As one example, the success rate may additionally or alternatively be based on the number of payloads that failed to be processed by the service pipeline, the number of payloads that were received by each service in the service pipeline, the number of payloads that were processed by the service pipeline within a particular time period, and/or the amount of processing time by each service. As another example, the success rate may additionally or alternatively be based on the number of payloads that failed to be processed by the service pipeline, the number of payloads that were transmitted to each service in the service pipeline, the number of payloads that were processed by the service pipeline within a particular time period, and/or the amount of processing time by each service. In such examples, the success rate may be presented as a percentage value, a decimal value, a text value, an alphanumeric value or set of values, or any other indicator.

At operation 310, the metrics service causes one or more actions to be performed based on the calculated success rate. To determine whether an action is to be performed, the metrics service may use an evaluation component, such as action triggering mechanism 208, to evaluate the success rate (or a value associated with the success rate) against one or more predefined threshold values or rule sets. When the success rate value meets or exceeds a threshold value or satisfies the conditions of one or more rules of a rule set, the metrics service may determine that an action is to be performed. Alternatively, to determine whether an action is to be performed, the metrics service may provide one or more action options to a user. The metrics service may determine whether to perform action based on the user's response to the provided action options.

Examples of actions include generating a notification or alert associated with an activity, the success rate of the service pipeline (or an indication thereof), providing payload processing information for the services of the service pipeline, providing payload transmission and/or processing information for payloads during transmission between services of the service pipeline, generating a result set of content associated with an activity, executing reporting functionality associated with the service pipeline payload processing, executing or provisioning a process or a service, terminating or removing an executing process or an executing service, performing corrective or preventative actions, scheduling one or more events or tasks to be performed, providing instructions for potential or recommended actions, or alerting a third party of actions to be performed.

Figure 4:
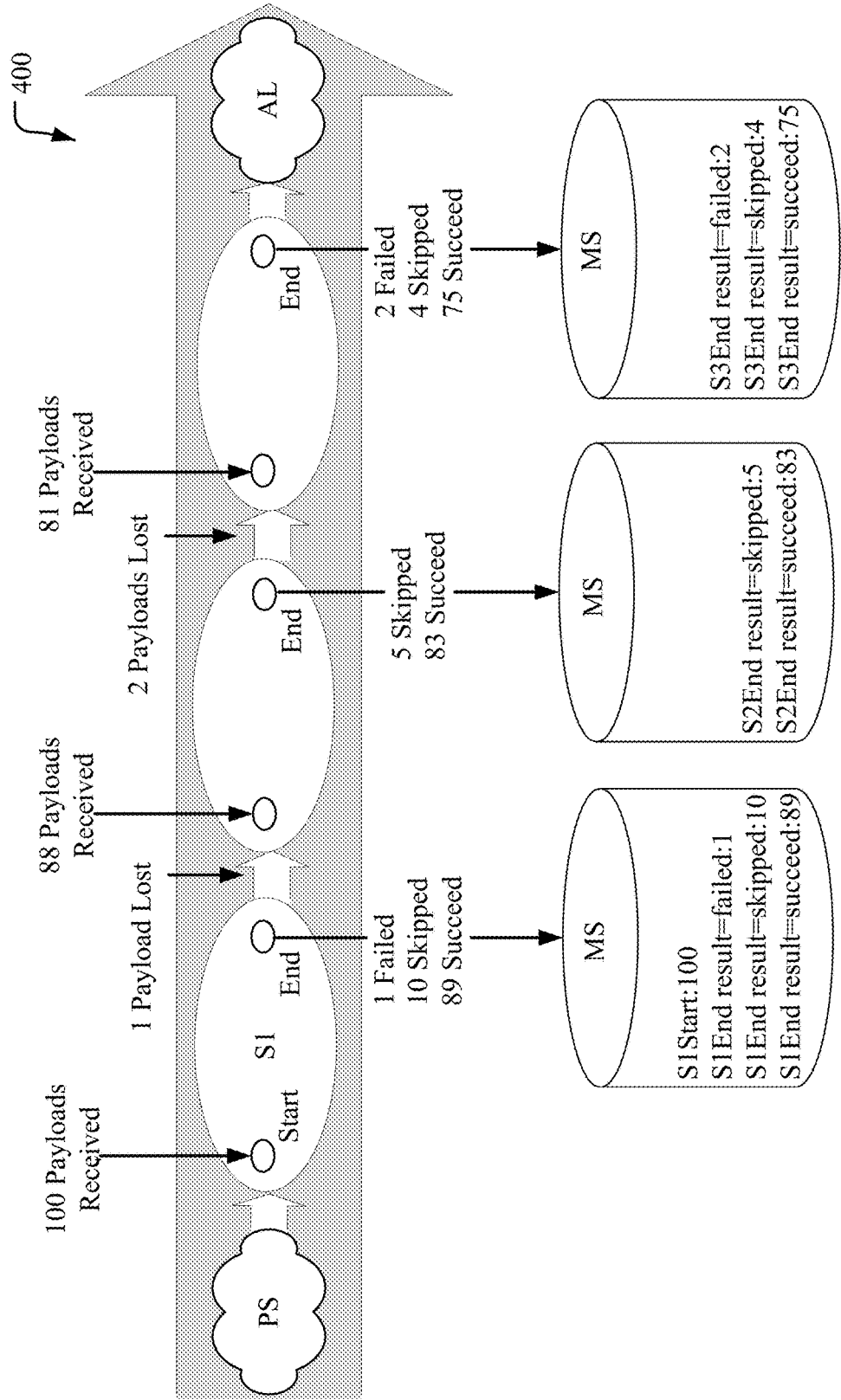
FIG. 4 illustrates an example processing flow for calculating a success rate for a service pipeline

FIG. 4 illustrates an example processing flow for calculating a success rate for a service pipeline. Although services S1, S2, and S3 are each illustrated in flow 400 as a single service, it is contemplated that one or more of S1, S2, or S3 may represent multiple services. It is further contemplated that the metric store may be a single entity or may represent multiple metric store entities.

In example flow 400, 100 payloads are transmitted from a payload source (PS) and received by a first service (S1) of a service pipeline. Upon detecting S1 has received the 100 payloads, a metric store (MS) records the number of payloads received by S1 as the value S1 Start (100). While processing the 100 payloads, S1 emits metrics data indicating that one (1) payload has failed, ten (10) payloads have been skipped, and 89 payloads have succeeded (e.g., have been successfully processed by S1). MS detects the metrics data emitted by S1 and records the respective processing result values as S1End result=failed (1), S1End result=skipped (10), and S1End result=succeed (89). The 89 payloads requiring additional processing by the service pipeline are transmitted to a second service (S2) of the service pipeline.

During transit to S2, transmission of one (1) of the 89 payloads has failed or the payload(s) have been lost. Accordingly, 88 payloads are received by S2. While processing the 88 payloads, S2 emits metrics data indicating five (5) payloads have been skipped and 83 payloads have succeeded (e.g., have been successfully processed by S2). MS detects the metrics data emitted by S2 and records the respective processing result values as S2End result=skipped (5) and S2End result=succeed (83). The 83 payloads requiring additional processing by the service pipeline are transmitted to a third and final service (S3) of the service pipeline.

During transit to S3, transmission of two (2) of the 83 payloads have failed or the payload(s) have been lost. Accordingly, 81 payloads are received by S3. While processing the 81 payloads, S3 emits metrics data indicating two (2) payloads have failed, four (4) payloads have been skipped, and 75 payloads have succeeded (e.g., have been successfully processed by S3). MS detects the metrics data emitted by S3 and records the respective processing result values as S3End result=failed (2), S3End result=skipped (4), and S3End result=succeed (75). The 75 payloads may then be transmitted to one or more additional locations (AL).

Upon, during, or after completion of the service pipeline, MS calculates a success rate for the service pipeline (S1-S3) using the recorded metrics data for each service. In example flow 400, the metrics service calculates the success rate using the formula below:

$$\text{Success Rate} = \frac{S1\text{End(Skipped)} + S2\text{End(Skipped)} + S3\text{End(Succeed + Skipped)}}{S1\text{Start}}$$

$$= \frac{10+5+75+4}{100} = 94\%$$

Accordingly, MS calculates the success rate of the service pipeline as 94%, which indicates that 94% of the 100 payloads were successfully processed and/or skipped by the service pipeline. Although a specific formula for calculating the success rate is disclosed, alternative methods of calculating the success rate are contemplated.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration, and, as is understood, a vast number of computing device configurations may be utilized for practicing aspects of the disclosure, described herein.

Figure 5:
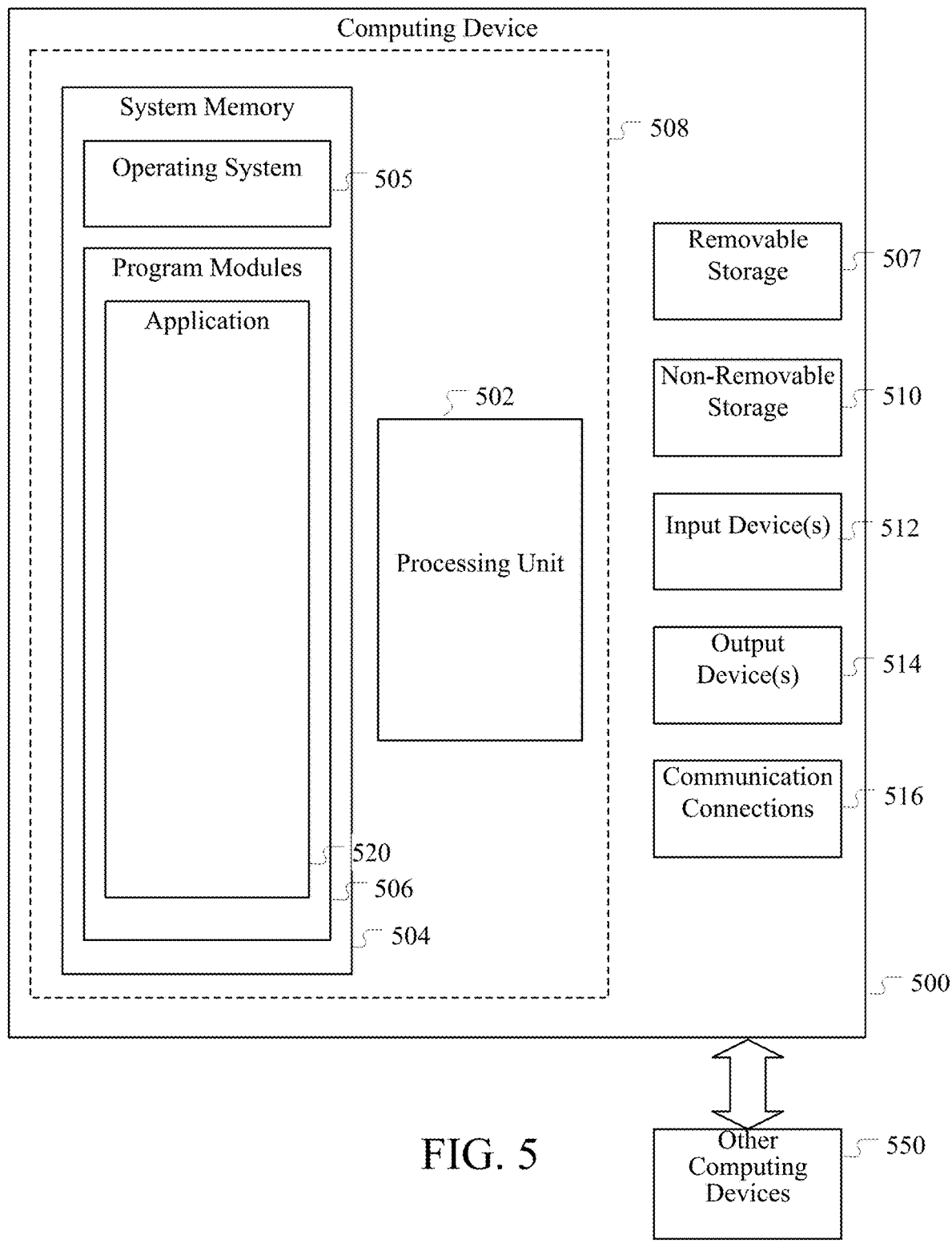
FIG. 5 is a block diagram illustrating example physical components of a computing device for practicing aspects of the disclosure.

FIG. 5 is a block diagram illustrating physical components (e.g., hardware) of a computing device 500 with which aspects of the disclosure may be practiced. The computing device components described below may be suitable for the computing devices and systems described above. In a basic configuration, the computing device 500 includes at least one processing unit 502 and a system memory 504. Depending on the configuration and type of computing device, the system memory 504 may comprise volatile storage (e.g., random access memory), non-volatile storage (e.g., read-only memory), flash memory, or any combination of such memories.

The system memory 504 includes an operating system 505 and one or more program modules 506 suitable for running software application 520, such as one or more components supported by the systems described herein. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 507 and a non-removable storage device 510.

As stated above, a number of program modules and data files may be stored in the system memory 504. While executing on the processing unit 502, the program modules 506 (e.g., application 520) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 507, and the non-removable storage device 510 are all computer storage media examples (e.g., memory storage). Computer storage media may include random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

Figure 6A:
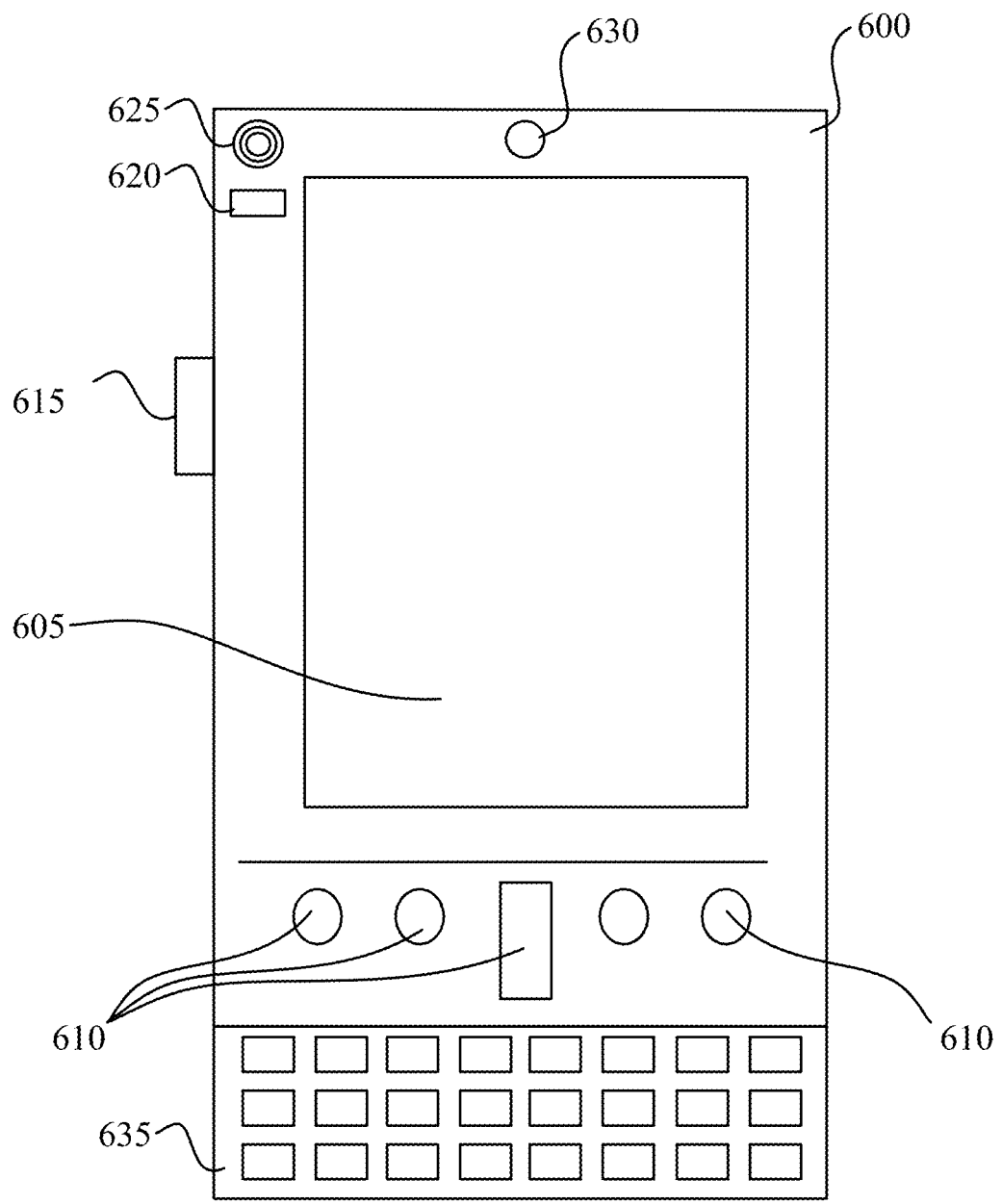
FIGS. 6A and 6B are simplified block diagrams of an example mobile computing device for practicing aspects of the present disclosure.
Figure 6B:
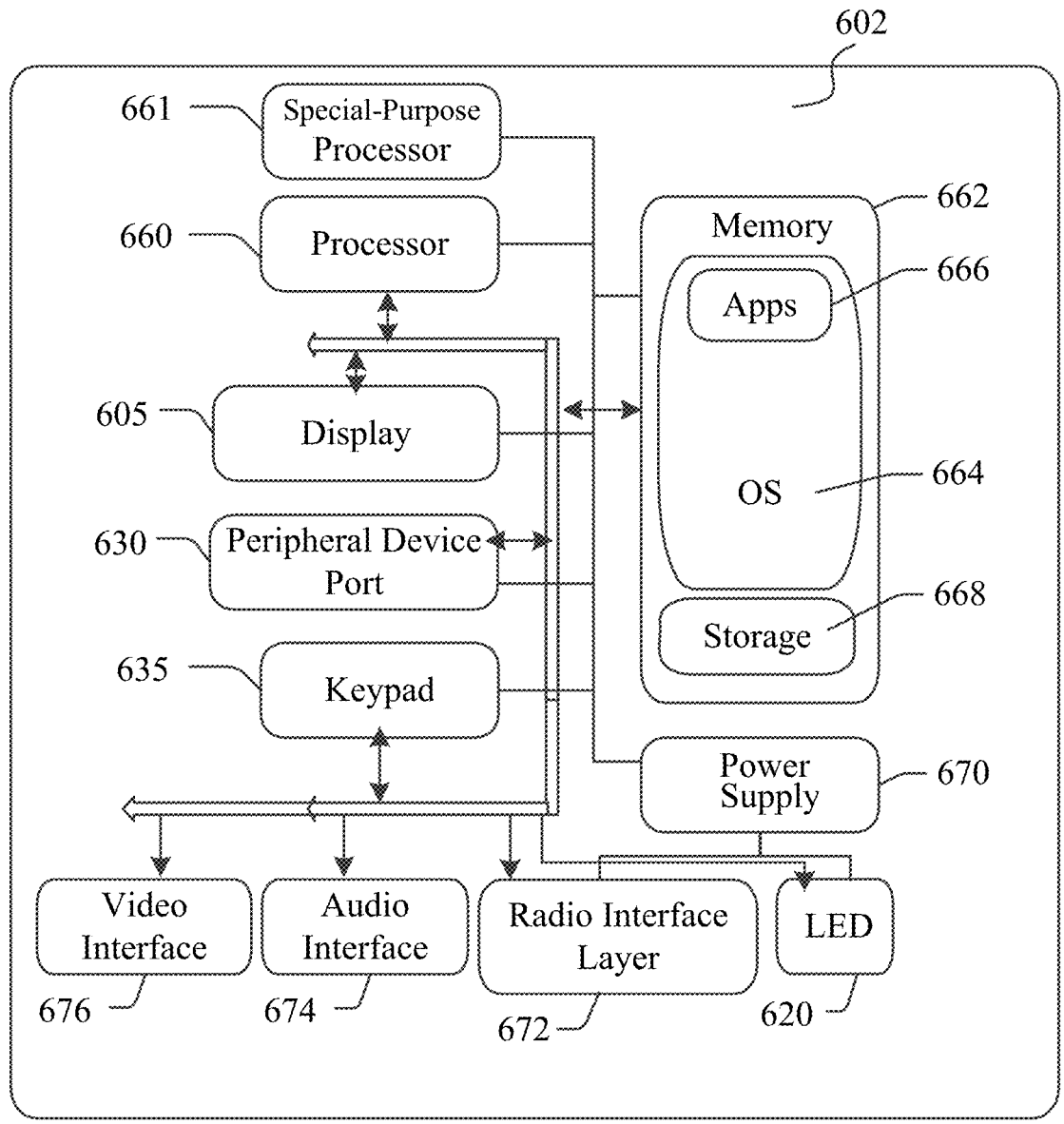

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator (e.g., light emitting diode (LED) 620) may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor(s) (e.g., processor 660 and/or special-purpose processor 661) and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of a peripheral device port 630 (e.g., an on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
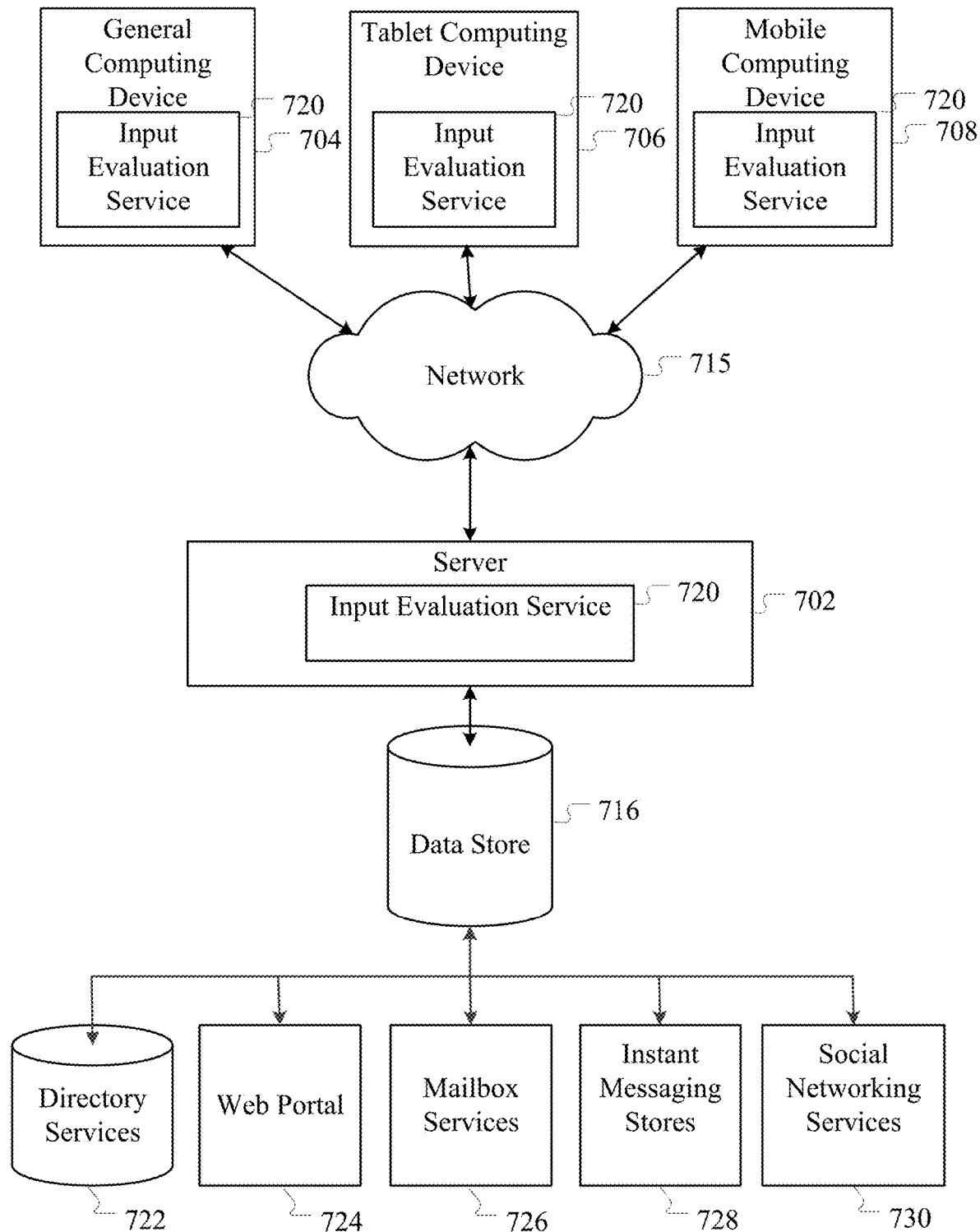
FIG. 7 is a simplified block diagram of an example distributed computing system for practicing aspects of the present disclosure.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

An input evaluation service 720 may be employed by a client that communicates with server device 702, and/or input evaluation service 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
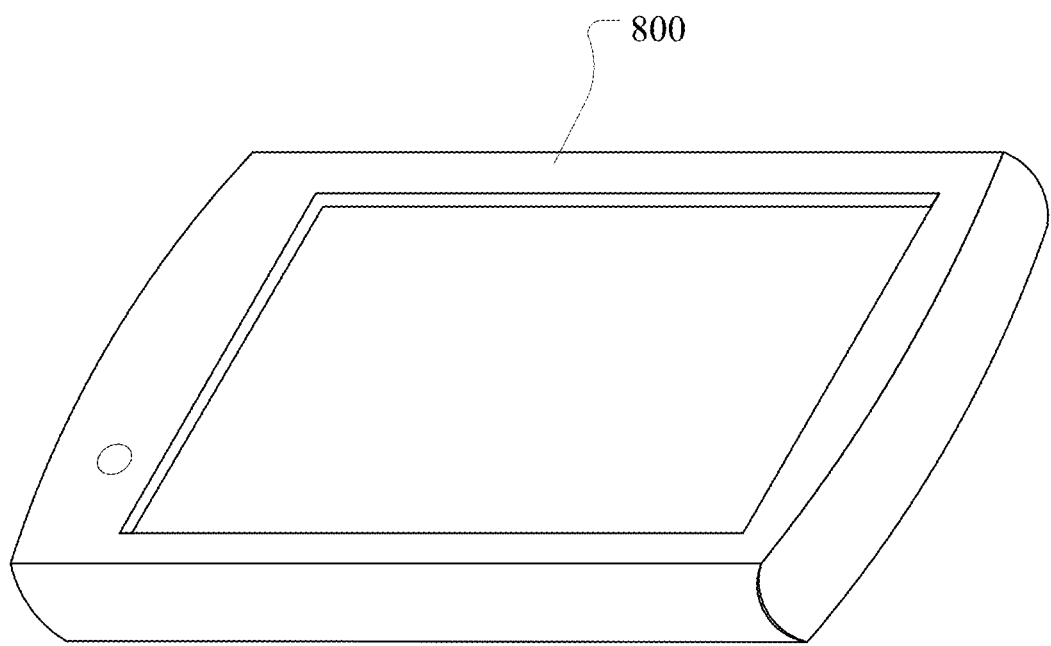
FIG. 8 illustrates an example tablet computing device for executing one or more aspects of the present disclosure.

FIG. 8 illustrates an example of a tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one example of the technology relates to a system comprising: a processor; and memory coupled to the processor, the memory comprising computer executable instructions that, when executed by the processor, perform a method. The method comprises: detecting a payload transmitted to a first service and a second service in a service pipeline; collecting metrics data emitted by the first service and the second service responsive to processing at least a portion of the payload by the first service and the second service; aggregating the metrics data into a first grouping of data corresponding to the first service and a second grouping of data corresponding to the second service; calculating a success rate for the service pipeline based on the aggregated metrics data; and performing an action based on the success rate.

In another example, the technology relates to a computer-implemented method. The method comprises: collecting, by a metrics service, metrics data emitted by a first service and a second service in a service pipeline responsive to receiving and processing at least a portion of a plurality of payloads by the first service and the second service; aggregating, by the metrics service, the metrics data into a first grouping of data corresponding to the first service and a second grouping of data corresponding to the second service; calculating a success rate for the service pipeline based on the aggregated metrics data; and performing an action based on the success rate.

In another example, the technology relates to a system comprising: a processor; and memory coupled to the processor, the memory comprising computer executable instructions that, when executed by the processor, perform a method. The method comprises: detecting a plurality of payloads transmitted to a first service, a second service, and a third service in a service pipeline; analyzing metrics data emitted by the first service, the second service, and the third service responsive to processing at least a portion of the plurality of payloads by the first service, the second service, and the third service, the analyzing the metrics data comprising synchronizing a timestamp in the metrics data emitted by the first service, the second service, and the third service for a particular payload of the plurality of payloads; aggregating the metrics data into a first grouping of data corresponding to the first service, a second grouping of data corresponding to the second service, and a third grouping of data corresponding to the third service; calculating a success rate for the service pipeline based on the aggregated metrics data; and performing an action based on the success rate.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processor; and
   memory coupled to the processor, the memory comprising computer executable instructions that, when executed by the processor, perform a method comprising:
   detecting a payload transmitted to a first service and a second service in a service pipeline;
   collecting metrics data emitted by the first service and the second service responsive to processing at least a portion of the payload by the first service and the second service;

aggregating the metrics data into a first grouping of data corresponding to the first service and a second grouping of data corresponding to the second service;

calculating a success rate for the service pipeline based on the aggregated metrics data for the first service and the second service, wherein the success rate is calculated based on a first number of payloads skipped by the first service and the second service and a second number of payloads successfully processed by a last service in the service pipeline; and performing an action based on the success rate.

2. The system of claim 1, wherein the payload comprises data corresponding to at least one of an event, an entity, or a transaction associated with an activity or service request.

3. The system of claim 1, wherein detecting the payload transmitted to the first service and the second service comprises detecting whether transmission of the payload to the first service or the second service failed.

4. The system of claim 3, wherein detecting a failure of the transmission of the payload to the first service or the second service comprises determining at least one of a reason for the failure or a network location of the failure.

5. The system of claim 1, wherein the metrics data emitted by the first service and the second service comprises at least a payload processing end time and a payload processing result.

6. The system of claim 5, wherein the payload processing result indicates:
a number of payloads successfully processed;
a number of payloads failed; and
a number of payloads skipped.

7. The system of claim 5, wherein the metrics data emitted by the first service and the second service further comprises at least one of:
a payload identifier;
a number of payloads received by the first service or the second service; or
service identification information for the first service or the second service.

8. The system of claim 1, wherein the metrics data emitted by the first service and the second service comprises a set of metrics data for a subpart of the first service or the second service.

9. The system of claim 1, wherein a plurality of payloads comprising the payload are transmitted to the first service and the second service, and wherein collecting the metrics data emitted by the first service and the second service comprises applying the metrics data to a particular payload of the plurality of payloads corresponding to the metrics data.

10. The system of claim 9, wherein applying the metrics data to the particular payload includes at least one of:
adding the metrics data to a header of the particular payload; or
appending the metrics data to a body of the particular payload.

11. The system of claim 1, wherein aggregating the metrics data into the first grouping of data and the second grouping of data comprises sorting the first grouping of data and the second grouping of data by payload processing result.

12. The system of claim 1, wherein collecting the metrics data emitted by the first service and the second service comprises:

identifying a timestamp in the metrics data emitted by the first service, the timestamp indicating a payload receipt time by the first service for a particular payload; and
synchronizing the timestamp to the metrics data emitted by the second service for the particular payload.

13. The system of claim 1, wherein the success rate is further calculated based on:
a number of payloads skipped by each service in the service pipeline; and
a number of payloads received by the first service.

14. The system of claim 1, wherein performing the action based on the success rate comprises:
determining that the success rate exceeds a threshold value; and
performing the action.

15. The system of claim 1, wherein performing the action based on the success rate comprises:
providing a plurality of action options including the action to a user;
receiving a selection of the action from the plurality of action options from the user; and
performing the action based on the selection by the user.

16. A computer-implemented method comprising:
collecting, by a metrics service, metrics data emitted by a first service and a second service in a service pipeline responsive to receiving and processing at least a portion of a plurality of payloads by the first service and the second service;
aggregating, by the metrics service, the metrics data into a first grouping of data corresponding to the first service and a second grouping of data corresponding to the second service;
calculating a success rate for the service pipeline based on the aggregated metrics data for the first service and the second service, wherein the success rate is calculated based on a first count of payloads skipped by the first service and the second service and a second count of payloads successfully processed by a last service in the service pipeline; and
performing an action based on the success rate.

17. The method of claim 16, wherein collecting the metrics data emitted by the first service and the second service comprises:
identifying a timestamp in the metrics data emitted by the first service, the timestamp indicating a processing start time of the first service for a particular payload in the plurality of payloads; and
synchronizing the timestamp to the metrics data emitted by the second service for the particular payload.

18. The method of claim 16, wherein collecting the metrics data emitted by the first service and the second service comprises applying a data schema to the metrics data emitted by the first service and the second service, the data schema defining at least one of:
permissible or required data dimensions;
data dimension formatting; or
data dimension ordering.

19. A device comprising:
a processor; and
memory coupled to the processor, the memory comprising computer executable instructions that, when executed by the processor, perform operations comprising:
detecting a plurality of payloads transmitted to a first service and a second service in a service pipeline;
analyzing metrics data emitted by the first service and the second service responsive to processing at least a portion of the plurality of payloads by the first service and the second service, the analyzing the metrics data comprising synchronizing a timestamp in the metrics data emitted by the first service and the second service for a particular payload of the plurality of payloads;

aggregating the metrics data into a first grouping of data corresponding to the first service and a second grouping of data corresponding to the second service;

calculating a success rate for the service pipeline based on the aggregated metrics data for the first service and the second service, wherein the success rate is calculated based on a first count of payloads skipped by the first service and the second service and a second count of payloads successfully processed by a last service in the service pipeline; and performing an action based on the success rate.

20. The system device of claim 19, wherein performing the action comprises providing, to a user interface, payload processing information for the first service and the second service.

* * * * *